Dec. 12, 1933.  D. G. ADAMS  1,938,571
LUBRICATING APPARATUS
Filed July 13, 1932
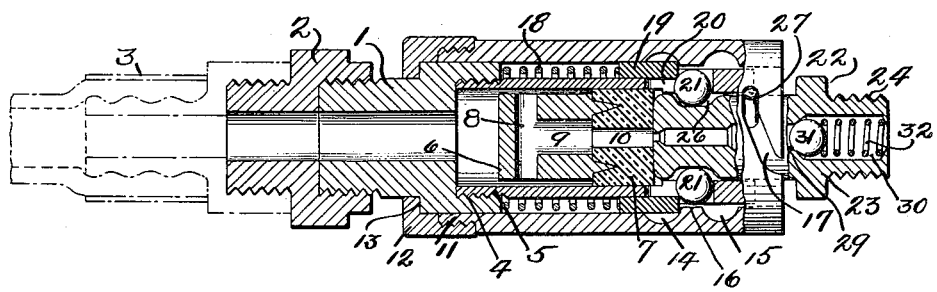
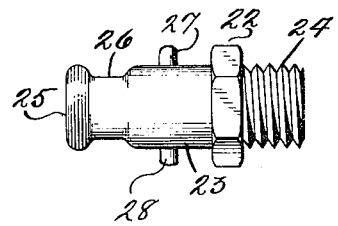
INVENTOR
Daniel G. Adams,
BY
Riddle, Margeson and Hornidge.
ATTORNEYS.

Patented Dec. 12, 1933

1,938,571

UNITED STATES PATENT OFFICE 1,938,571

LUBRICATING APPARATUS

Daniel G. Adams, New York, N. Y., assignor to Adams Grease Gun Corporation, New York, N. Y., a corporation of New York Application July 13, 1932. Serial No. 622,205

2 Claims. (Cl. 285—176)

This invention relates to an improvement in lubricating apparatus adapted for supplying grease under pressure to bearings or other parts to be lubricated.

One of the objects of the invention is the provision of a grease cup or fitting constructed and arranged for cooperation with a coupler of the ball type attached to a grease gun or pump whereby the coupler may be detachably connected to the fitting or grease cup the coupler and cup being so constructed and arranged that these two devices are drawn together in coupling them together to provide a seal against the leakage of grease along the outside of the cup.

In the drawing wherein I have illustrated an embodiment of my invention:

Fig. 1 is a sectional elevational view showing my improved coupler and fitting or grease cup; and Fig. 2 is an elevational view of the fitting.

Referring to the drawing in detail, the coupler illustrated is composed of a sleeve 1 threaded at its outer end to receive a member 2 which in turn is suitably connected to a grease gun or pump either directly or through the medium of a conduit such as that shown at 3. The opposite end of the sleeve 1 is provided with an enlarged bore 4 which receives a threaded fixed sleeve 5. Within this sleeve 5 is a floating piston 6. The forward end of this piston is forced into a gasket or washer 7 of leather, fiber, felt or other suitable material, the member 7 fitting the interior of the sleeve 5. The piston 6 is slightly smaller in diameter than the internal diameter of the sleeve 5 and grease is allowed to pass along the outside of this piston to the transverse passageway 8 with which the piston is provided, this passageway 8 in turn communicating with a passageway 9 extending longitudinally of the piston, the passageway 9 communicating with port or passageway 10 in the gasket 7.

On the outside of the enlarged portion of the base member 1 is a sleeve 11 slidably mounted thereon, this sleeve being provided at its rear end with a ring 12 which at its rear projects inwardly so as to engage the shoulder 13 provided on the member 1. This construction provides a stop or limit for the forward movement of the sleeve 11 with respect to the base member 1.

Adjacent its forward end the sleeve 11 is provided internally with two grooves 14 and 15 separated from each other by a ridge 16 which it will be appreciated also extends circumferentially of the sleeve.

The extreme outer end of the sleeve 11 is provided with cam slots 17 the function of which will be pointed out hereinafter.

Intermediate the sleeve 5 and the outer sleeve 11 is a coil spring 18 one end of which abuts the end of the base member 1 and the other a collar 19 which surrounds the sleeve 5 and which has movement longitudinally of the sleeve.

The sleeve 5 adjacent its forward end is provided with slots 20 which carry locking balls 21 the diameter of these balls being such that the balls project inwardly as well as outwardly of the sleeve 5, this outward projection of the balls being engaged by the collar 19.

The fitting of this invention is designated 22 and comprises a tubular member 23 which for convenience is threaded at its rear end as shown at 24 to facilitate attachment of the same to a part to be lubricated. The forward end of the body portion of the tubular member 23 is flat as shown at 25 and is adapted, as will be pointed out hereinafter, to engage the flat forward face of the gasket 7. To the rear of its forward end the tubular member 23 is provided with a peripheral locking groove 26 adapted to cooperate with the locking balls 21 to provide a detachable connection between the coupler and the fitting or cup.

To the rear of this groove 26 I provide projections 27 and 28 on the cylindrical member 23 which may be in the form of a pin passing transversely through the member 23 and having its ends projecting from the periphery thereof. These projections 27 and 28 are adapted for cooperation with the slots 17 in the sleeve 11 of the coupler, as will now be described.

In use the coupler is forced over the end of the cup or fitting 22 the balls 21 engaging the forward end of the fitting. With a slight pressure toward the fitting the collar 19 will be pushed inwardly of the sleeve 11 against the action of the spring 18 until the groove 14 is in line with the balls 21. A slight further inward motion of the sleeve 11 will permit the spring 18 to push the balls forward again so that they will lie in the locking groove 26 of the fitting with the ridge 16 between the grooves 14 and 15 of the sleeve directly about the balls and preventing their outward movement. At this time the projections 27 and 28 have engaged the slots 17 and by giving the sleeve 11 a slight partial turn the coupler will be drawn up snugly on the cup or fitting 22 to bring the end 25 of the fitting or grease cup into engagement with the gasket 7 of the floating piston 6. The engagement of the gasket with the end of the cup is increased when the device is put into operation, that is to say, when grease under pressure is forced into the apparatus.

The grease cup or fitting is provided with longitudinal bores, the two rear bores having been designated 29 and 30. These bores are of different diameters and the junction of these two bores provides a seat for a ball valve 31 in the bore 30, this valve being held to its seat except when the device is being operated by a spring 32.

It will be seen from the foregoing, therefore, that I have provided a ball coupler and a cooperating grease cup of such construction that sealing of the end of the cup against the passage of grease along the outside of the cup is assured owing to the provision of the cam slots 17 which are adapted to draw the coupler and fitting or cup together in the application of the coupler.

This application is a continuation in part of my co-pending application Serial No. 329,361, filed December 31, 1928.

What I claim is:—

1. In combination a ball coupler, a cooperating grease cup or fitting, said grease cup being provided with a peripheral locking groove for cooperation with the balls of the coupler and with projections cooperating with slots in the coupler for drawing the coupler and cup together in the operation of applying the coupler to the fitting or cup.

2. In combination a coupler comprising a sleeve, a gasket for said sleeve, a grease cup or fitting adapted to be received by said sleeve, locking balls carried by said sleeve, a locking groove on the periphery of the grease cup for engagement with said ball to lock the coupler to the fitting, projections on said cup or fitting, and cam slots in said coupler for cooperation with said projections to draw the coupler to the cup or fitting with the end of the cup in engagement with the face of said piston.

DANIEL G. ADAMS.